United States Patent [19]

Mathauser

[11] 4,051,616

[45] Oct. 4, 1977

[54] ROD WITH STRIKE SIGNALLING APPARATUS

[76] Inventor: William R. Mathauser, Box 1333, Sun Valley, Idaho 83353

[21] Appl. No.: 685,157

[22] Filed: May 11, 1976

[51] Int. Cl.² ............................................. A01K 97/12
[52] U.S. Cl. ...................................................... 43/17
[58] Field of Search ............................................ 43/17

[56] References Cited

U.S. PATENT DOCUMENTS

| 2,575,049 | 11/1951 | Dean | 43/17 |
| 3,074,196 | 1/1963 | Bronson, Sr. | 43/17 |
| 3,238,659 | 3/1966 | Lamb, Jr. | 43/17 |

FOREIGN PATENT DOCUMENTS

1,111,642  11/1955  France ..................................... 43/17

Primary Examiner—Russell R. Kinsey
Assistant Examiner—Daniel J. Leach
Attorney, Agent, or Firm—Shoemaker and Mattare, Ltd.

[57] ABSTRACT

A device for use with a fishing rod for signalling when a fish has struck the hook. The device is protected from damage and is extremely accurate and reliable. One form of the invention comprises a strain gage mounted inside the rod and controlling circuitry located inside the rod to signal when the rod flexes a predetermined amount. Other forms of the invention include a strain gage mounted on the outside surface of the rod, and a magnetically operated reed switch mounted inside the rod.

22 Claims, 10 Drawing Figures

ROD WITH STRIKE SIGNALLING APPARATUS

BACKGROUND OF THE INVENTION

The present application in general relates to fishing equipment, and in particular, relates to fishing rods with strike signalling apparatus.

As every fisherman knows, there is only one proper, or "ideal" time to set the hook after a fish has struck the bait. This "ideal" time varies with each individual fisherman, and further varies according to the conditions, type of fish and numerous other factors. It is often the case, especially with novice fisherman, that such "ideal" time is often missed, and the fish is able to escape. It goes without saying, that such situations are disappointing and frustrating. Such situations may even occur with expert fisherman who may have temporarily released the fishing rod, or whose attention is otherwise temporarily diverted. For example, in trolling, the fishing rods are mounted on a boat, and the attention of the fisherman must be divided between steering the boat and the fishing rod. This is often quite difficult, and strikes can often be missed, even by expert fisherman.

Heretofore, the "ideal" time to set the hook has been "sensed" by the fisherman. Of course, an expert fisherman has a developed sense of feel which is very sensitive as compared to a novice fisherman. However, even such expert fisherman may miss the ideal time if his attention is diverted. Hence, to overcome this problem, there are several types of strike signalling systems presently available. However, as will be discussed below, all of the systems suffer from similar disadvantages of inconsistent signalling, inaccurate signalling, and unreliable operation. Furthermore, these systems are almost impossible to alter so that they can be adapted to different situations, and often interfere with the balance and control of the rod.

An example of such systems are those devices which employ a bell on the rod that rings when a fish strikes. However, in addition to the other drawbacks, such devices suffer from the disadvantage that, as the prey is reeled in, the bell is constantly ringing, and the fisherman is subjected to the cacophony of the bell while he is reeling in the fish. Furthermore, such devices, in addition to being inaccurate, often completely fail to signal a strike at all.

Still other devices utilize electronic circuitry to monitor a fishing rod. Such devices generally have normally open switches mounted on the outside of the rod, which switches are closed when the rod flexes. Such exteriorly mounted switches are exposed to the environment and thus, dirt, salt, moisture, or the like may cause malfunctioning or jamming of the switches. The jamming can be caused by dirt entering the switch, or by the rusting of some of the parts of the switch, or the like. In any event, such switches generally become unreliable and inaccurate after some period of use.

If the switches do not completely jam, they often become inaccurate. But worse than this, the switches tend to provide inconsistent operation, as the flexing which closes the switch when the switch is clean may not close it when the switch is dirty. Thus, a fisherman has no reliable way of setting the switch so that he will be assured of being notified when it has proven most useful to him after a fish has taken the hook in the manner which the fisherman deems to be a strike, i.e., the "ideal" time to set the hook. Thus, a previous setting may not be reliably used to set the alarm system for larger or smaller fish, or even held constant for the same size fish, due to the inconsistent switch closing characteristics.

Often, the sensitivity of the known switches cannot be varied. Thus, once set, the devices may prove to be useless for fish smaller, or larger, than the setting reference. To change the settings of known systems, elements of the system often must be replaced, a difficult and often expensive procedure.

Additionally, with known systems, there are extra weights or encumbrances on the fishing rod resulting from the system elements. Such additional weights and encumbrances make casting and control of the rod difficult.

The present invention is a lightweight, variable rod-mounted strike signalling system which is protected from damage from the environment and which is mounted on the rod in a manner unlikely to interfere with the balance and control of the rod.

SUMMARY OF THE INVENTION

The strike signalling system embodying the apparatus of the present invention is protected from damage, and can be set to monitor any degree of flexing of the rod with any desired degree of accuracy, delay and reliability.

The apparatus embodying one form of the present invention comprises a strain gage mounted in a bore defined inside the flexible section of a fishing rod, and which is connected to an electronic circuit mounted inside the handle of the fishing rod. The circuit elements are thus located inside the rod, and the circuit includes a master switch, audio and/or visual alarm means which are activated by the electronic circuit when the strain gage emits a signal of a predetermined level. An adjusting means is also mounted on the handle to vary the sensitivity of the electronic circuit. As a strain gage can sense flexures which vary from a very large amount down to the millimeter ranges, virtually any degree of sensitivity can be set for the apparatus.

The strain gage package is preferably located inside the rod, and is hence protected from dirt, moisture, and the like which is often present in the environment surrounding a fishing rod. In addition to the rod, the package itself serves to protect the strain gage. Thus, once set, the strain gage will react with extreme degrees of predictability and sensitivity to the flexing of the rod, thus, actuating the alarm circuit in a very reliable and predictable manner.

A remote hook-up jack is also mounted on the handle so that the signal can be sent to a location remote from the rod, if so desired.

An alternative form of the apparatus embodying the present invention includes a strain gage package mounted on the outside of the fishing rod. As a strain gage can be quite small and light, this strain gage package can be suitably and adequately protected from the elements to produce reliable and accurate signals without significantly disturbing the balance and/or control of the rod. Such an embodiment is suitable for use on existing, non-hollow rods, and can be sold separately from the rod.

In yet a further form of an apparatus embodying the present invention, the strain gage is replaced by a magnetically operable reed switch mounted inside a chamber defined in the flexible section of the fishing rod. A magnetically impermeable shield is positioned between a magnet and the reed switch, and is attached by a taut wire to the tip of the fishing rod. When that tip flexes, as it will when a fish strikes the hook, the wire pulls the shield out of the shielding position and thus exposes the magnet to the reed switch. The switch is connected to an electric circuit located in the handle of the rod, and completes that circuit upon actuation of the switch to activate a visual and/or audio alarm thereby signalling the strike.

The switch in the last-mentioned embodiment is also located within the rod, and hence is completely protected from the environment. Thus, the switch is not susceptible to jamming or damage, and will provide reliable and predictable actuation of the circuit. The sensitivity of this last-mentioned embodiment can be adjusted by mounting suitable means on the rod which is connected to the taut wire to vary the tension in the wire connecting the shield to the rod tip, or by providing other means on the rod for adjusting the length of the path which the shield must move to expose the magnet to the reed switch.

In all of the above-discussed embodiments, once the rod returns to the unflexed position, the switches assume their normal position and the alarm circuits are again open, thus shutting off the alarm. The master switches can also be used to turn off the alarms if so desired. Thus, once a strike has occurred and has been signalled, the fish can be reeled in with the alarms deactivated.

Furthermore, with the systems mounted entirely inside the rod, the rod is not encumbered and casting and control thereof is not inhibited. Even in the one form having a strain gage on the outside of the rod, the strain gage package is so small as to be unnoticable.

The systems embodying the present invention can also be used as training devices, as the flexure (for example, in a casting procedure, or in teaching the "ideal" time to set the hook) other than the proper amount can be set to sound the alarms.

It is noted that the amount of rod flexing which sets off the alarms can be selected according to the desires of each individual fisherman and/or situation. Thus, one fisherman may wish to be notified of a strike earlier than another fisherman in order to attempt to set the hook at an earlier time than such other fisherman. Further, different times may be selected by an individual fisherman for different fish, or conditions, according to his own desires. Throughout the present disclosure, reference will be made to a "predetermined amount of rod flexing", this term is taken to mean the amount of flexing determined to be most advantageous to the particular fisherman for the particular situation. Such fine adjustments of rod flexing sensitivity are made possible by the sensitivity, accuracy and reliability of the systems of the present invention, as well as the sensitivity adjusting means herein disclosed. Such fine and reliable sensitivity adjustments are not possible with known strike signalling systems.

OBJECTS OF THE INVENTION

It is a main object of the present invention to provide a completely protected strike signalling system for use with a fishing rod.

It is another object of the present invention to provide a striking signalling system which is accurate, reliable, and predictable.

It is a further object of the present invention to provide a strike signalling system having a variable degree of accuracy and delay time.

It is yet another object of the present invention to provide a strike signalling system which produces essentially no interference with rod balance and/or control.

These together with other objects and advantages which will become subsequently apparent reside in the details of construction and operation as more fully hereinafter described and claimed, reference being had to the accompanying drawings forming part hereof, wherein like numerals refer to like parts throughout.

DETAILED DESCRIPTION OF THE PREFERRED EMBODIMENTS

Figure 1:
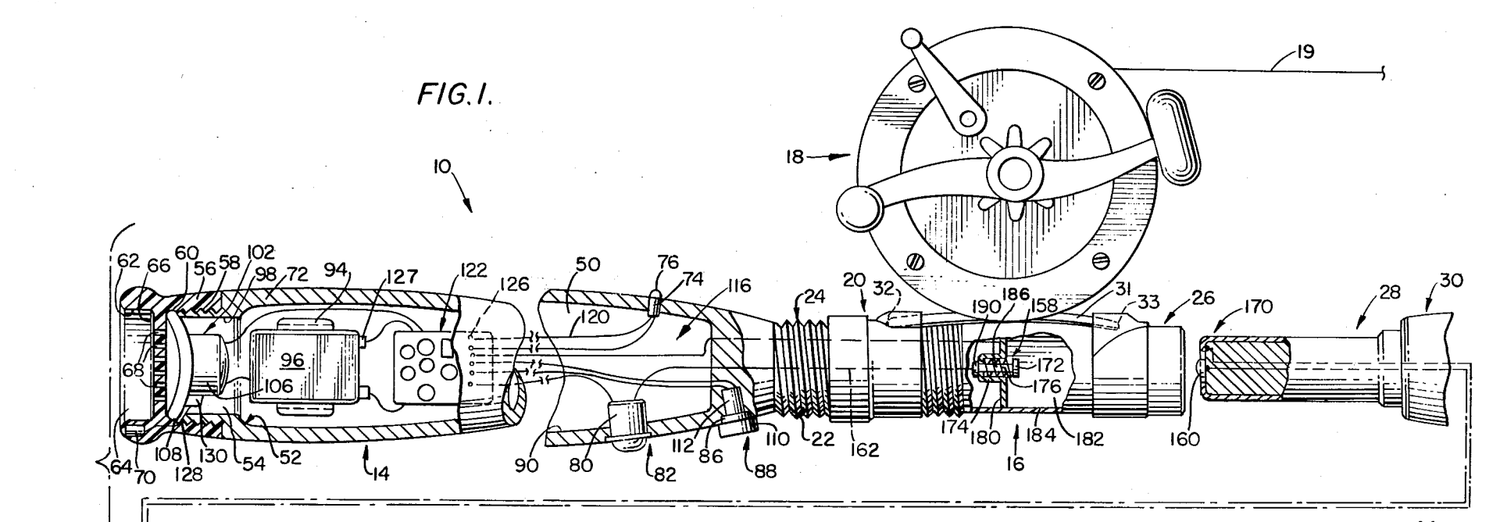
FIG. 1 shows a view in longitudinal section and partially broken away of a fishing rod utilizing one form of the apparatus embodying the teachings of the present invention.

Shown in FIG. 1 is a fishing rod 10 utilizing the strike signalling means of the present invention. The fishing rod can be tapered, and formed of glass, or steel, or the like, and is sectional comprising a flexible section 12 and a handle 14 connected together by a reel supporting section 16 having mounted thereon a conventional reel 18 which contains fishing line 19. The reel supporting section is attached to the handle by a ferrule 20 threadably engaged on threads 22 positioned on the outise of neck 24 of the handle 14, and to the flexible section 12 by an adjustable yoke or ferrule 26 which may be plastic and adjustably holds projecting portion 28 of the flexible section 12 to the reel supporting section 16 by means of a friction fit between the ferrule 26 and member 30.

The reel 18 is of a known type, and is held on a reel seat by a base 31 engaged in mounting wells 32 and 33 in ferrules 20 and 26 respectively. Line 19 from that reel is guided by the usual longitudinally spaced apart line guides, such as guide 40, which are attached to the rod body in the usual manner as by wrapping-type mount 42. A tip line guide 44 is mounted on rod tip-top 46 by a mount 48 to be forwardly inclined from that tip in a known manner. The tip moves in the usual manner in response to tension applied to the line threaded through the line guides from the reel. The tension on the line guides results from the usual forces found in the fishing art.

As best shown in FIG. 1, the handle 14 is hollow, having a central, axial bore 50 which is stepped at 52 to define a distal end bore 54. The distal, or terminal end of the handle 14 is closed by an end cap 56 which is threadably engaged on the handle by complementary and cooperating threads 58 and 60 on the handle and the end cap respectively. As shown in FIG. 1, the end cap has an essentially cylindrical wall 62 defining therein a counter bore 64 and a wall 66 having defined therein a multiplicity of essentially parallel sound emitting holes, such as hole 68. The outer wall 62 has a threaded portion in which is defined a seat for an electrical plug-in jack 70, which will be discussed below.

Mounted in wall 72 of the handle 14 is a light socket 74 for receiving and mounting a light, such as an LED 76, onto the handle 14. A switch mount 80 is also mounted in wall 72 for receiving and mounting a master switch 82 onto the handle 14. A further circuit element mount 86 is mounted on handle 14 for receiving and mounting a circuit sensitivity adjusting means 88 onto the handle 14. Mounted on inside surface 90 of the wall 72 is a battery mount 94 which detachably mounts battery 96 within the bore 50, and mounted on inside surface 98 of bore 54 is audio signalling device 102 such as a horn or buzzer. The device 102 comprises a body 106 and a speaker 108 located adjacent sound emitting holes 68 to force audio signals through those holes, as will be later described.

The mount for the device 102 may be of the usual construction, and further details of this structure will not be given. The master switch is also of a known type, such as a push button switch. The circuit sensitivity adjusting means can be a potentiometer which is adjusted by a finger controlled knob, such as knob 110, and has the usual circuit elements located in a housing 112 positioned within a mounting well in the handle 14.

The just-described elements form parts of an electronic circuit which is generally indicated by the numeral 116, and are interconnected by lead wires, such as wire 120, and are connected to a circuit board 122 mounted in axial bore 50 and which serves as a main junction box for all of the various circuit elements of the strike signal indicator embodying the present invention. The circuit elements can be suitably connected directly to each other and to the circuit board, or all directly connected to the circuit board, where the suitable interconnection of the elements can be made. The elements, mounts, and circuit board all have suitable jacks, or wire attaching mounts, for attaching the lead wires thereto, such as mount 126 on the circuit board, and connector jack 127 on the battery mount. As is also shown in FIG. 1, jack 70 is connected to audio indicator unit 102 by a lead wire 128 and shunting circuitry 130 which serves to shunt the signal sent to the audio indicator to a remotely located signalling means (not shown), such as another audio or visual indicator, or a remote monitoring means or the like.

The remote pick-up jack 70 can also be used by a commercial fisherman using several fishing rods. In such a case, the rods would be attached to a monitoring unit (not shown) via jacks 70, which would signal which rod is being flexed. Thus, several rods could be monitored simultaneously. As shown in the figures, the electronic circuit 116 is positioned inside handle 14. Thus, the circuit elements are protected from damage due to environmental factors such as moisture, dirt, salt, and the like, as well as from damage due to mishandling. The end cap provides easy access to the battery, or the rest of the circuit 116 in the event some changes are desired, however.

The electronic circuit 116 is actuated according to the flexing of the rod 10 by a switching circuit comprising a strain gage 142 mounted in a mounting well 144 located within and axially aligned with the flexible section 12 of the rod 10 near the tip thereof. Lead wires 150 and 152 are also located within and axially aligned with the flexible section 12 of the rod 10 and connect the strain gage 142 with the rest of the circuit 116 via a spring loaded connecting pin 158, a contact pin 160 and lead wire 162 which can be connected to the master switch 82. The lead wires can also be mounted in an axial bore within the rod, if desired. Thus, one lead wire is connected to the circuit elements and power source and the other lead wire is connected to ground.

As shown in FIG. 1, one end of the projection 28 is attached to member 30 and the other end, denoted by the numeral 170, is free and has the contact pin 160 mounted therein to register with head 172 of the contact pin 158 which is resiliently urged outwardly of a mounting well 174 by a spring 176. The mounting well 174 is located in a wall 180 located within an axial bore 182 defined in reel supporting section 16 by outer wall 184 thereof. The pin 158 has an electrically conductive body 186 which contacts rear electrical connector means 190 attached to the mounting well 174. The lead wire 162 is attached to the contact 190 to form a complete circuit with the strain gage via the pin 158, contact 160 and lead wire 152 when the projection 28 is suitably fastened in the bore 182 to attach the flexible rod section 12 to the reel supporting section 16 to assemble the rod 10.

The lead wire 150 is suitably attached to ground, as by attachment to the free end 170 of the projection 28 or alternatively, the lead wire 150 can be connected to another wire leading back to the circuit board 122 where it is attached to ground, or the rest of the circuit as desired. A further contact, similar to spring loaded contact 158 can be mounted on wall 180 to accommodate this type of connection. Alternatively, the contact pin 158 itself, might be altered to accommodate an electrical circuit lead path for connecting the ground wire 150 to circuit 116 in which case, a lead wire in addition to lead wire 162, may be included. In any event, the strain gage lead wires are connected to form a circuit with the circuit 16 so that the strain gage acts as a switch, which, when suitable actuatable, completes the circuit between the power source and the visual and/or audio indicating means to activate those devices.

As is well known, strain gages are extremely sensitive and can detect strain of a body down to as low as one-millionth of an inch. Thus, the amount of bending in the fishing rod used to set off the alarm systems can be set with extreme accuracy, and to any degree of sensitivity desired.

The strain gage 142 can be any suitable type, such as a grid of fine alloy wire or thin foil, bonded to paper, covered, and then rigidly bonded, as by cementing, to inner surface 200 of the strain gage mounting bore 144 in the rod flexible section 14. The strain gage is covered with material, or encased so that the gage is fully protected from the environment. The strain gage package can then be used on a fishing rod in the environment usually damaging to such sensitive devices because of the moisture, dirt, salt, and the like often found in such environment. As strain gages are generally very small, they can be wrapped in a very secure manner by only a small amount of material so as not to significantly alter the weight or handling characteristics of the rod. Gages with appropriate gage factors can be selected for the most reliable operation. The covering of the gage can be selected to protect that gage when the rod is used. For example, the covering could be waterproof to maintain the gage in a dry condition.

The circuit board 122 can include the usual circuitry associated with strain gages, such as a Wheatstone Bridge, or ballast circuits. Amplifying means can also be used to increase the intensity to the gage signal to a level suitable for use in circuit 116. Sophisticated circuit boards might even comprise a discriminating means for evaluating the magnitude of the gage signal.

If a Wheatstone Bridge circuit is used in conjunction with the circuit 116 and circuit board 122, the bridge can be set so that the only unbalance is the change in resistance in the active-strain gage, and thus the potential difference between the output teminals becomes the measure of the strain. Thus, suitable means such as capacitors, or the like, can be appropriately connected to the bridge so that when the bridge output reaches a predetermined level, the circuit 116 is completed, thus activating the alarm. The sensitivity adjusting means 88 can be suitably connected with this bridge-sensing element circuit to adjust that element to activate the alarms at predetermined levels of strain gage output, which levels are variable, by varying the adjusting means 88. A suitable Wheatstone Bridge circuit is shown in FIG. 6, and suitable strain gages are shown in FIGS. 7 and 8.

For example, a strain gage 1/16th of an inch long can be mounted on a 1 inch piece of metal. Of course, other means for sensing the output of a strain gage can be used, such as transistors, or the like, without departing from the teaching of the present invention, and the Wheatstone Bridge concept is intended to be merely a suggestion and not intended as a limitation. Furthermore, the entire circuit can be transistorized, or can be integraged on a chip, or the like, without departing from the teachings of this invention.

Figures 3, 6, 7, 8, 9:
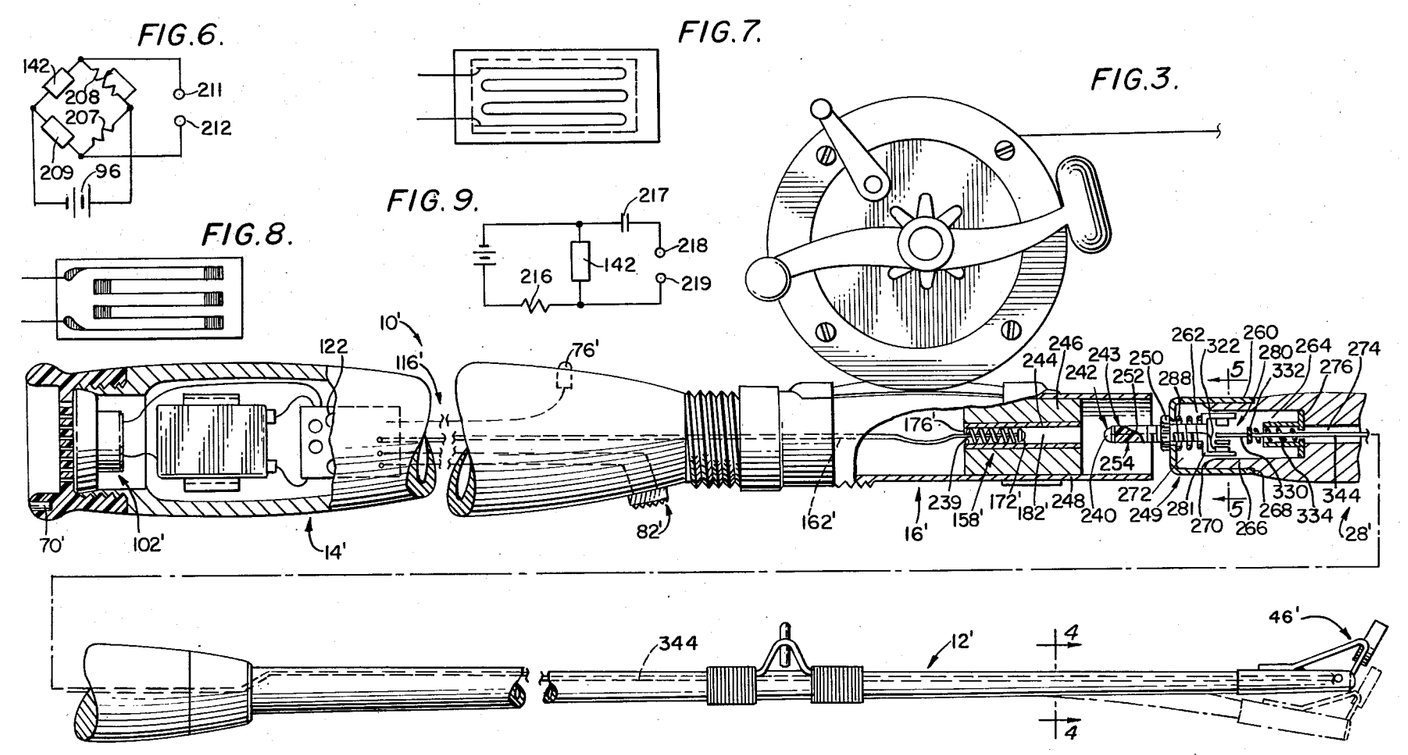
FIG. 3 is a view partially in longitudinal section and partially broken away of the fishing rod utilizing another form of the apparatus embodying the teachings of the present invention.
FIG. 6 is a schematic representation of a Wheatstone Bridge Circuit in accordance with the teachings of the present invention.
FIG. 7 is a plan view of a wire strain gage in accordance with the teachings of the present invention.
FIG. 8 is a plan view of a foil strain gage in accordance with the teachings of the present invention.
FIG. 9 is a schematic view of a circuit which can be used in one form of the present invention.

FIG. 6 shows a bridge with a dummy gage. The circuit comprises a resistor 207 and a variable resistor 208 as well as a dummy gage 209 which is usually bonded to an unstressed piece of the rod to cancel out temperature effects in the strain gage. The alarm activating means will then be suitably connected to terminals 211 and 212. Such a dummy gage may not be required, and might only be used on a very sophisticated setup. Otherwise, a usual bridge circuit can be used.

A further strain gage circuit might be a ballast-type circuit wherein only rapidly varying, or dynamic, strains are detected. Such a circuit is shown in FIG. 9 and includes a resistor 216, a capacitor 217 and a strain gage 142, and may be mounted in the circuit board 122, with the alarm actuating means connected to the terminals denoted 218 and 219 in FIG. 9.

The dynamic circuit would allow normal, steady flexing of the rod, such as might occur when the line is being drawn in, but would set off the alarm if a strike occured during this flexing and caused the rod to flex in addition to such "steady" flexing.

Suitable elements can also be placed in the circuit 116 to control the time constant of the circuit for delaying actuation of the alarm any amount of time, if so desired.

The strain 142 is placed in the flexible rod section 12 at a position most likely to react at a desired time to the tension applied to fishing line 19 by a strike.

Thus, it is seen that the strain gage will react to the bending or flexing, of the rod, which is indicated in FIGS. 1 and 3 by the dotted line representation of tip-top 46, and emit a signal which will be received by the appropriate circuits element and circuit board 122. When that signal reaches a predetermined level, other circuit elements in circuit board 122 will complete the electronic circuit 116 to thereby energize the audio and/or visual alarm to signal a strike.

It is noted that the audio alarm can comprise a radio speaker or a Sonalurt (trademark) diaphragm audio unit produced by Mallory, Inc., wich emits a signal at a frequency above the harmonics of the ocean or airplanes. Furthermore, C-Moss circuitry can be used as such circuitry produces only a very small drain on the battery.

Figure 2:
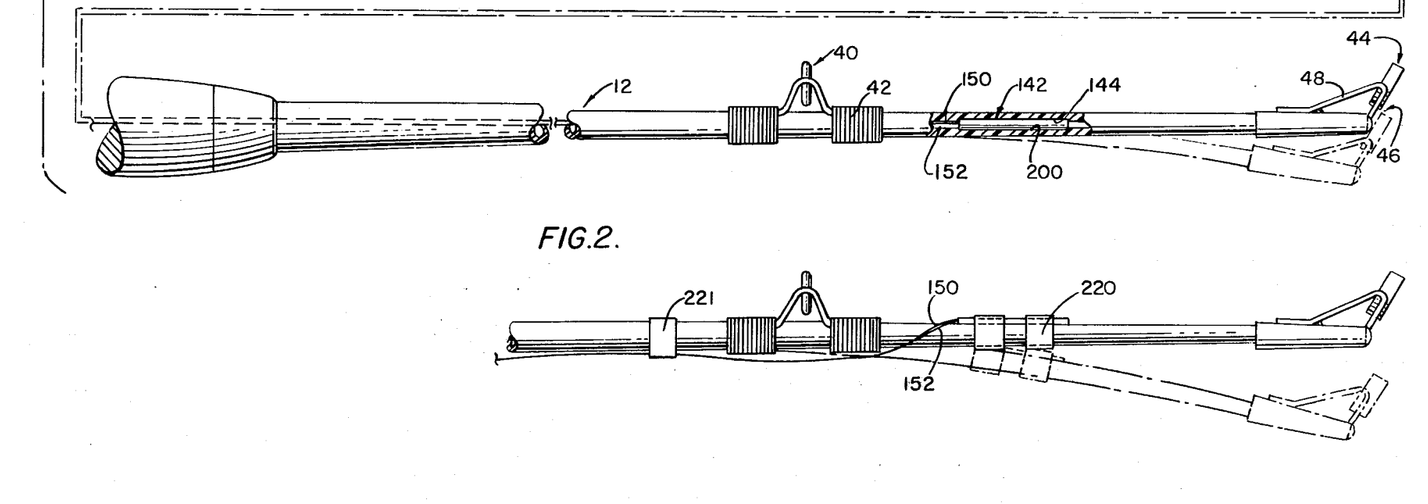
FIG. 2 is an elevation view of the fishing rod having a strain gage mounted on the outside thereof in accordance with the teachings of the present invention.

As shown in FIG. 2, the strain gage can also be located on the outside of the rod 10 and bonded thereto as shown in FIG. 2 using cement and suitable wrappings 220. The lead wires 150 and 152 can also be located on the outside of the rod in which case they will pass through entrance passages (not shown) located somewhere in the rod, but preferably in the handle, to be connected to the circuit board and/or appropriate elements of circuit 116. Mounting means, such as tape 221, can be used to hold the wires on the rod. If the gage is located on the outside of the rod, additional casing, or other protective means, should be used to protect the gage from damage due to moisture or other environmental conditions to which the rod may be subjected. Such a strain gage could be purchased separately and mounted on an existing rod by a user without requiring him to purchase a new fishing rod.

Thus, both embodiments of the strain gage utilize a type of "package" wherein the strain gage is fully and completely protected from damage due to moisture, or dirt, or other material which is foreign and potentially damaging to the strain gage. The strain gage package in FIG. 1 is itself further protected by the rod. However, the protection of the strain gage package in the FIG. 2 embodiment is also selected to adequately protect that strain gage.

It is seen that the strain gages of the present invention will therefore produce reliable, predictable, and accurate indications of a strike as they are not susceptable to jamming or damage such as are known switches, especially those employing mechanical switches mounted on the outside of the rod. Such mechanical switches are subjected to moisture, salt, dirt, and the like which may cause jamming or other similar unreliable operation.

The protective packaging can be any suitable material such as plastic, metal, moisture resistant tape, cloths, of the like.

Strain gages are generally quite small, even when completely protected as are the strain gages of the present invention, thus, any strain gage package will be quite small and light. Therefore, neither strain gage package of this present invention will inhibit the balance or control of the rod. Even a strain gage package mounted on the outside of the rod, as in FIG. 2, is so small and light that movement of the rod, including flexing thereof, as well as control of the rod, is essentially uninhibited.

A further embodiment of the present invention is shown in FIG. 3. The rod 10' has a handle 14' and a flexible section 12' connected to the handle by a reel supporting section 16' as in the FIG. 1 embodiment. The circuit 116' is similar to the circuit 116, and the master switch 82' is shown to be a finger or thumb operated sliding switch. The light 76', audio indicator 102' and remote plug-in jack 70' are also similar to those shown in the FIG. 1 embodiment. A spring-loaded contact pin 158' has a shank 239 and is located in a bore 182' within the reel supporting section 16'. A spring 176' yieldably urges pin 158' into a position whereat head 172' contacts head 240 of contact pin 22, which is mounted on the distal end of an externally threaded housing 243. Lead wire 162' is electrically connected to the other end of the shank 239 of the pin 158'. Guided by spring 176', the pin 158' slides axially within the bore 182' which is defined by wall 244 mounted on filling 246 within the wall 248 of the reel supporting section 16'.

As shown in FIG. 3, projection 28' has an end cap 249 and the threaded contact pin 242 has an adjustment nut 250 threaded thereonto and cooperating with threads 252 on the shank 254 of the contact pin. The end cap is hollow and wall 260 defines an axial bore 262 therein. The projection means 28' has an open axial bore 264 in one end thereof and the wall 266 defining the bore is tapered and has a peripheral shoulder 268 defined in the outer surface thereof and is spaced apart from the end 270 of the wall. The end cap 249 is snap fit around the outer surface of the wall 266 and the end of that cap is seated against the shoulder 268 to define an enclosed stepped chamber 272 comprising bores 262 and 264. A further axial bore 274 is defined axially within the flexible section 12' and extends from the end 276 of the bore 264 to the tip of the rod having thereon tip-top 46'. The bore 274 has a diameter smaller than that of bore 264 to define a shoulder at the junction of the two bores.

Figure 5:
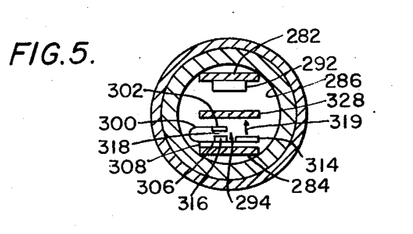
FIG. 5 is an elevation view taken along line 5—5 of FIG. 3.

A switch means 280 is positioned within the chamber 272 and comprises a yoke 281 connected to the shank 254 of the contact pin 242 and yieldably urged away from the end wall of the cap 249 by a spring 288. The yoke has yoke arms 282 and 284 which can be mouned on inner surface 286 of the wall 266 as by bonding, cementing or the like, if so desired. With reference to FIGS. 3 and 5, yoke arm 282 has attached thereto a magnet 292 which is disposed inwardly of the yoke to be presented toward yoke arm 284 which has a reed switch 294 mounted thereon to be disposed toward yoke arm 282.

As best shown in FIG. 5, the reed switch has a stationary reed contact 300 which is U-shaped and has one leg thereof mounted on arm 284 and an electrical contact pin 302 on the inner surface of the outer leg thereof. A movable reed contact arm 306 is pivotally mounted on a pivot 308 which, in turn, is mounted on yoke arm 284. The reed contact arm 306 is essentially straight and has one end fixed to the yoke, and to arm 300, and the other end free and having a magnetically attactable pin 314 thereon. Electrical contact pin 316 is mounted on movable reed contact arm 306 to correspond in location with contact 302 of the stationary reed contact arm, but spaced apart therefrom to define a gap 318 therebetween.

When mangetically attractable pin 314 is exposed to magnet 292, the contact arm 306 is pulled upwardly in the direction indicated by arrow 319 toward magnet 292 and rotates about a fulcrum formed at the fixed end thereof. Electrical contact pin 316 is moved toward electrical contact pin 302 on the stationary reed contact arm. Gap 318 is narrowed until, ultimately, the electrical contact pin 316 contacts electrical contact pin 302. A lead wire 322 connects one of the contact arms to the contact pin 242 while the other contact arm is suitably grounded.

Contact pin 242 is in electrical contact with contact pin 158' via the head 172' when the rod is assembled so that the projection 28' with end cap 249 is received within bore 182' of the reel support section. Lead wire 162' is suitably connected in circuit 116' as was discussed above in regard to the FIG. 1 embodiment. Thus, reed switch 294 is connected to circuit 116 via lead 322, contact pins 242 and 158' and lead wire 162'. As was the case in the FIG. 1 embodiment, the other reed contact arm can be grounded to the rod, or have a further lead suitably connected to the circuit board 122 as by further contact pins, or suitably divided contact pins 242 and 158'. Thus, when magnet 292 is exposed to the reed switch 294, circuit 116' will be completed thereby activating the alarm to signal a strike.

The reed switch 294 is a normally open switch and a shield 328 is positioned between the magnet and the switch to shield the switch from the magnet and allow the contact arm 306 to assume its normal position spaced from contact arm 300. The shield is formed of a material which is magnetically impermeable and is supported in position between the magnet and the reed switch by a mounting arm 330 as is shown in FIG. 3. The mounting arm 330 has a stop 332 thereon and is urged into the shielding position shown in FIG. 1 by a spring 334 engaged around the arm and against the stop at one end thereof. A sleeve is attached to the wall 276 and extends outwardly therefrom to support and guide the spring and mounting arm in the position shown in FIG. 3.

A shield actuating cable 344 is securely attached at one end to the mounting arm 330 and at the other end to the inside of the rod tip. The cable can be of any suitable material, such as, for example, a piano wire. Cable 344 is maintanined taut so that when the rod tip is flexed into the position shown in dotted lines in FIG. 3, which would occur if a fish strikes the hook, the cable pulls against the spring 334 and pulls shield 328 out of the shielding position to expose the magnet to the reed switch, thereby activating the same to actuate circuit 116' and activate the alarm, or alarms.

Figure 4:
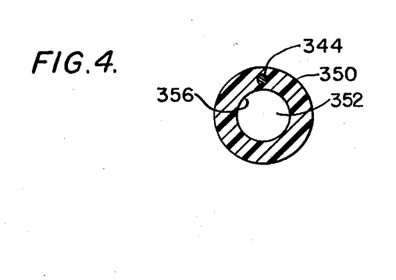
FIG. 4 is an elevation view taken along line 4—4 of FIG. 3.

As is best shown in FIG. 4, the flexible section 12' is hollow with an outer wall 350, and has an axial bore 352 defined therein. A longitudinally running raceway is defined in inner surface 356 of the wall 350 to receive the shield actuating cable 344. The raceway is preferably positioned whereat it will be located on top of the rod when the rod is in use. However, other locations may be used. Furthermore, a central core may be positioned within bore 352, and the raceway defined therein. The sensitivity of the alarm system can be varied by suitably adjusting the tension on cable 344, the spring 334, or the length of travel of the path over which the shield must move in order to expose the magnet to the switch. Thus, a device can be mounted on the rod and connected to the cable 344 to vary the tension of that cable. Such a device may, for example, be similar to the devices used to set the tension on guitar strings, and have such strings wound around them. Another device may be used to set the distance which the shield travels before sufficiently exposing the magnet to the reed switch, to actuate that switch. An example of such a device would be a lost motion type device wherein one portion thereof must traverse a path of a predetermined, an variable, length before engaging another portion fixed to the shield and which will then move the shield as the first portion continues to move. Yet another alternative for varying the sensitivity of the FIG. 3 embodiment comprises means for adjusting reed switch gap 318 to produce a delay time into the circuit, if so desired. Such a means might, for example, include a scew-operated shim located between the movable contact arm and the yoke. The movable contact arm 306 can also be suitably mounted, or made of suitable material to flex according to a desired flexure curve to further control the response of circuit 116' to a strike.

As the switch shown in FIG. 3 is located inside the rod, it is, like the strain gages of the embodiments, protected against the environment. Once the rod is assembled, the rod itself keeps moisture, dirt, and the like away from the switch thereby maintaining the switch clean and free of material which could inhibit the reliablility, accuracy and operation thereof.

The FIG. 3 switch, like the switches shown in FIGS. 1 and 2, is light and will therefore not inhibit movement of the rod to any significant degree. Furthermore, because the FIGS. 1 and 3 switches are located inside the rod, they can be positioned, at, or near, the central longitudinal axis thereof so that the balance of the rod is preserved. However, even though the FIG. 2 switch is not located at the exact central longitudinal axis of the rod, the strain gage package is so light that the balance of the rod remains relatively unaffected. Furthermore, none of the switches are large enough to significantly affect the flexing movement of the rod, even though some of them are located within the rod.

It is also noted that the alarm could be employed to teach flycasting. The system could be installed in a flycasting rod and would be actuated during a casting operation to sound if too much, or too little, flexing occurs in the rod during a cast. Thus, different signals could be used to identify too much flex and too little flex. In such a case, two strain gages might be employed, one on top of the rod and one on the bottom of the rod. Alternatively, the circuit could be arranged so that the alarms sounds unless there is a predetermined output from the strain gage, too little output activates the alarm, and too much output activates another (or the main) alarm.

Figure 10:
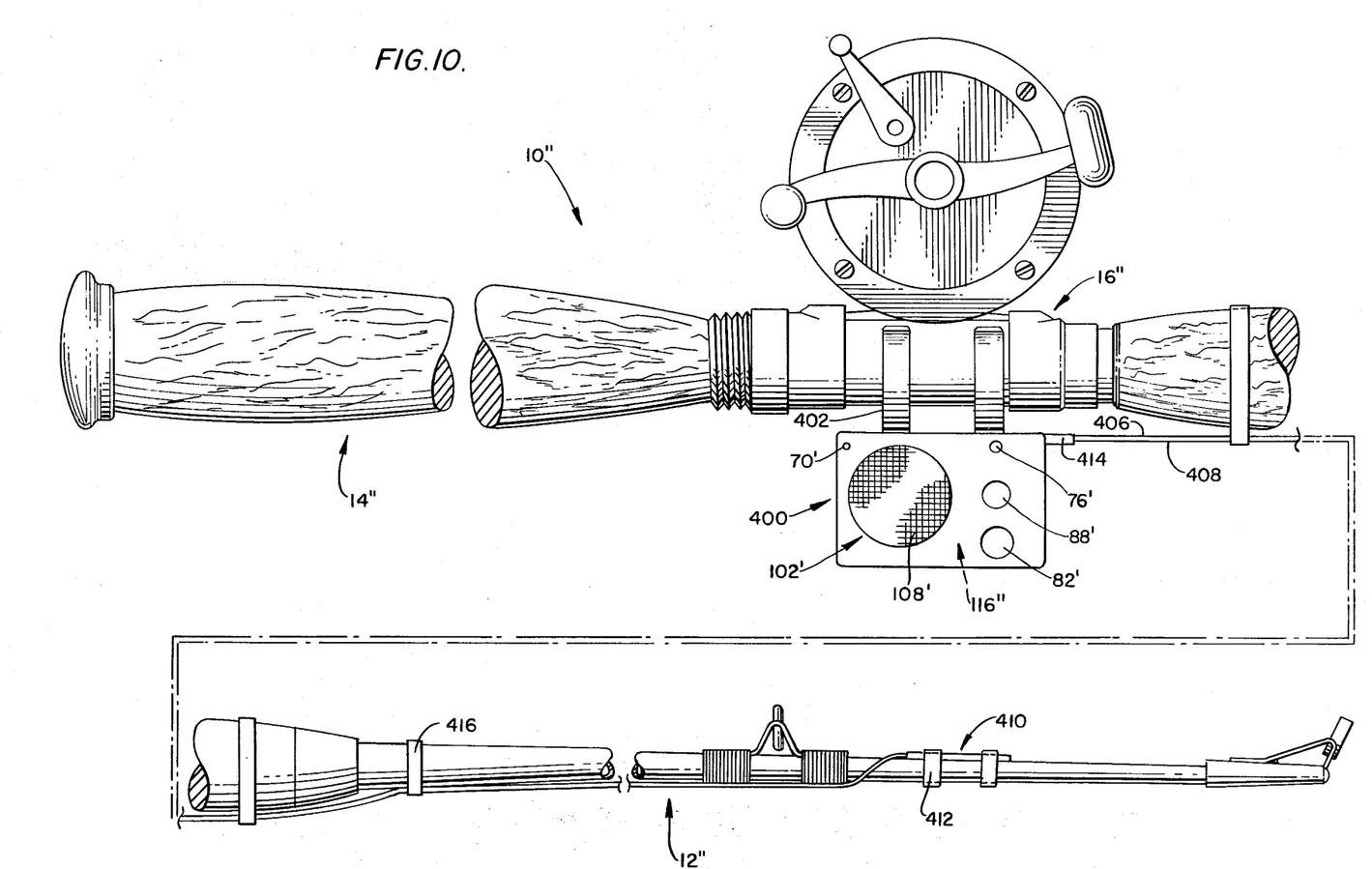
FIG. 10 shows a view in longitudinal section and partially broken away of a fishing rod utilizing another form of the apparatus embodying the teachings of the present invention.

Shown in FIG. 10 is another form of a fishing rod which can utilize and embodiment of the strike signalling apparatus of the present invention. The rod 10" is preferably a standard fishing rod having the usual flexible section 12" attached to a standard handle 14", such as a stock wood handle, via a reel supporting section 16".

As shown in FIG. 10, a housing 400 is attached to the reel supporting section 16" by a pair of springtype clamps or prongs 402 which partially encircle the section 16" to securely grip same. Mounted in, and housed by, the housing 400 are a plurality of circuit elements, such as audio indicator 102' having a speaker 108', an LED 76', a sensitivity adjusting means 88' and a master switch 82'. A remote pick-up jack 70' can also be mounted on the housing. These just-named elements comprise a circuit 116", and are similar to the above-discussed circuit elements comprising circuit 116 and 116', and are suitably connected to, and, in some forms, interconnected by, a circuit board similar to circuit board 122.

The circuit 116" is suitably connected by lead wires 406 and 408 to a strain gage package 410 which is mounted on the outside of flexible section 12" by mounting means, such as tape 412. The lead wires can be housed in a single cable which is attached to a mounting jack 414, which, in turn, is electrically connected to the circuit 116". The cable is mounted on the rod by mounting means, such as tape 416.

The strain gage package 410 has housed therein a strain gage similar to the strain gages discussed above. Thus, the strain gage is protected from damage caused by mishandling and/or environmental factors.

The apparatus shown in FIG. 10 is suitable for use with so-called "off-the-shelf" fishing rods, and yet is still light weight, rugged and will not significantly interfere with balance and/or control of the rod.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A strike signalling means for use in fishing comprising:
    a fishing rod having a fishing line and which flexes when a fish strikes a hook on said fishing line;
    an electronic circuit mounted within said fishing rod to be protected from damage;
    strike signalling means connected to said electronic circuit and controlled by said circuit to signal when a fish strikes said hook, said signalling means including a strain gage;
    rod flexure sensing means attached to said rod and to said electronic circuit to complete said circuit so that said strike signalling means is connected by said electronic circuit to a power source to be activated to signal a strike when said rod undergoes a perdetermined amount of flexure due to said strike, said rod flexure sensing means being protected from environmental conditions which may cause said sensing means to inconsistently sense said rod flexure.

2. The signalling means of claim 1 wherein said signalling means includes a light.

3. The signalling means to claim 1 wherein said signalling means including an audio indicator.

4. The strike signalling means of claim 2 wherein said signalling means further includes an audio indicator.

5. The strike signalling means of claim 1 further including an off-on master switch connected in said electronic circuit.

6. The strike signalling means of claim 1 wherein said electronic circuit includes a sensitivity adjusting means for controlling said circuit so that different amounts of rod flexure can be selected for causing said flexure sensing means to complete said circuit to actuate said strike signalling means.

7. The strike signalling means of claim 1 wherein said fishing rod includes a hollow handle and said electronic circuit is located in said hollow handle.

8. A strike signalling means for use in fishing comprising:
    a fishing rod having a fishing line and which flexes when a fish strikes a hook on said fishing line;

an electronic circuit mounted within said fishing rod to be protected from damage;

strike signalling means connected to said electronic circuit and controlling by said circuit to signal when a fish strikes said hook;

rod flexure sensing means attached to said rod and to said electronic to complete said circuit so that said strike signalling means is connected by said electronic circuit to a power source to be activated to signal a strike when said rod undergoes a predetermined amount of flexure due to said strike, said rod flexure sensing means being protected from environmental conditions. which may cause said sensing means to inconsistently sense said rod flexure, said flexure said flexure sensing means including a magnet, a pair of spaced apart contacts one of which is movable, magnetically actuable means on said movable contact for moving said movable contact into engagement with said other contact when actuated by said magnet, insulating means located between said magnetically actuable means and said magnet for preventing actuation of said magnetically actuable means by said magnet, and rod flexure sensing means connected to said insulating means for moving said insulating means upon a predetermined amount of flexure of said fishing rod so that said magnet actuates said magnetically actuable means.

9. A strike signalling means for use in fishing, comprising:

a fishing rod having a fishing line and which flexes when a fish strikes a hook on said line;

an electronic circuit mounted in said fishing rod and including an alarm means for signalling a strike, a switch having sensing means for sensing rod flexure, said switch being connected to said alarm for connecting said alarm to a power source after said fishing rod has undergone a predetermined amount of flexure, and an adjusting means on said rod for adjusting said sensing means.

10. The strike signalling means of claim 1 wherein said fishing rod has a handle which is separable therefrom.

11. The strike signalling means of claim 10 further including connection means on said handle for connecting said alarm circuit to a remote signalling means.

12. The strike signalling means of claim 8 wherein said rod flexure sensing means includes a wire connected to said rod.

13. The strike signalling means of claim 1 wherein said rod is hollow and has a longitudinal bore therein.

14. The strike signalling of claim 13 wherein said rod flexure sensing means is located within said longitudinal bore.

15. The strike signalling means of claim 13 wherein said rod is comprised of a plurality of separable sections with electric connecting means on cooperating sections of a pair of said sections for electrically connecting said flexure sensing means to said electronic circuit.

16. The strike signalling means of claim 12 wherein said fishing rod is hollow and one end of said wire is connected to a tip of the rod with the other end thereof connected to said insulating means, said wire being located within said rod and running longitudinally thereof.

17. The strike signalling means to claim 16 wherein said rod has a raceway defined in a wall inside said rod and said wire is positioned therein.

18. A strike signalling means for use in fishing, comprising:

a fishing rod including a hollow handle and a flexible section with an axial bore defined therein and connected to said handle by a reel supporting section supporting a reel with fishing line wound thereon, said fishing line having a hook thereon;

an electronic circuit mounted inside said hollow handle and including a power source, a circuit board, and an audio indicating means, all mounted in said handle and interconnected by lead wires;

a circuit sensitivity adjusting means, a master switch and a visual indicating means connected into a said electronic circuit and mounted on said handle;

a strain gage mounted in said flexible section axial bore adjacent one end of said flexible section for sensing the amount of flexure when said flexible section is flexed and emitting a signal which is approximately proportional to the amount of flexure;

a first contact pin connected to said electronic circuit by lead wires and located in said reel supporting section, and a second contact pin located in the other end of said flexible section and connected to said strain gage by lead wires, said contact pins being positioned to electrically couple said strain gage to said electronic circuit when said rod is assembled;

said electronic circuit including means for sensing said strain gage output and means for completing said circuit when said strain gage output reaches a predetermined level which corresponds to a predetermined amount of rod flexure thereby connecting said indicating means to said power source for activating said indicating means to signal a strike;

said sensitivity adjusting means being used to vary said predetermined level.

19. A strike signalling means for use in fishing, comprising:

a fishing rod including a hollow handle and a flexible section with an axial bore defined therein and connected to said handle by a reel supporting section supporting a reel with fishing line wound thereon, said fishing line having a hook thereon;

an electronic circuit mounted inside said hollow handle and including a power source, a circuit board, both mounted in said handle and interconnected by lead wires;

an audio indicating means, a visual indicating means, a master switch, and a circuit sensitivity adjusting means all connected into said electronic circuit and mounted on said handle;

said flexible section having defined therein a first axial bore in one end thereof and a second axial bore in the other end thereof which is connected at one end to said first axial bore and at the other end to the other end of said flexible section;

a hollow end cap engaged on said flexible section one end to define with said first bore a chamber;

a yoke positioned within said chamber and having a projecting portion extending axially of said flexible section and through said end cap;

a switch means mounted on said yoke and including a magnet and a reed switch having a stationary contact arm and a movable contact arm spaced from said stationary contact arm with a magnetically attractable means thereon, said movable contact arm being movably mounted on said yoke to move toward said stationary arm when it is exposed to said magnet to contact said stationary arm;

a first contact pin connected to said electronic circuit by lead wires and located in said reel supporting section, and a second contact pin located in the other end of said flexible section and connected to said switch means by lead wires, said contact pins being positioned to electrically couple said reed switch to said electronic circuit when said rod is assembled;

a movable magnetically impermeable shield located in shielding position between said magnet and said movable contact arm to prevent said magnet from being exposed to said movable contact arm;

a cable located in said flexible section second bore and connected at one end to said one end of said flexible section and at the other end to said movable shield to move said shield from said shielding position when said flexible section one end is flexed a predetermined amount so that said magnet attracts said switch movable contact arm to cause said arm to move toward said stationary arm and to contact said switch stationary arm to complete said circuit and activate said indicating means to signal a strike.

20. A strike signalling means for use in fishing, comprising:

a fishing rod having a fishing line and which flexes when a fish strikes a hook on said fishing line;

an electronic circuit mounted on said fishing rod to be protected from damage;

strike signalling means connected to said electronic circuit and controlled by said circuit to signal when a fish strikes said hook, said strike signalling means including a strain gage;

rod flexure sensing means attached to said rod and to said electronic circuit to complete said circuit so that said signalling means is connected by said electronic circuit to a power source to be activated to signal a strike when said rod undergoes a predetermined amount of flexure due to said strike, said rod flexure sensing means being protected from environmental conditions which may cause said sensing means to inconsistently sense said rod flexure.

21. The strike signalling means of claim 20 further including a housing mounted on a reel supporting section of said fishing rod and containing therein said electronic circuit.

22. The strike signalling means of claim 21 wherein said housing is releasably mounted on said reel supporting section.

* * * * *